United States Patent [19]

Lehtinen et al.

[11] Patent Number: 4,558,960
[45] Date of Patent: Dec. 17, 1985

[54] RADIAL FRICTION BEARING ASSEMBLY

[75] Inventors: Jukka A. Lehtinen; Arvo K. Karhola, both of Helsinki, Finland; Walter H. Griner, Lutry, Switzerland

[73] Assignee: Arcomac S.A., Yvonand, Switzerland

[21] Appl. No.: 719,334

[22] Filed: Apr. 3, 1985

[30] Foreign Application Priority Data

Apr. 9, 1984 [CH] Switzerland .................. 1766/84

[51] Int. Cl.⁴ .................................. F16C 33/10
[52] U.S. Cl. ............................ 384/373; 384/292; 384/398; 384/286
[58] Field of Search ............. 384/373, 398, 292, 115, 384/118, 113, 111, 286

[56] References Cited

U.S. PATENT DOCUMENTS

| | | | |
|---|---|---|---|
| 2,397,124 | 3/1946 | Buffington et al. | 384/292 |
| 2,479,349 | 8/1949 | Hagg | 384/292 |
| 3,517,973 | 6/1970 | Hirs | 384/115 |
| 3,726,572 | 4/1973 | Beardmore | 384/113 |
| 4,120,544 | 10/1978 | Huber | |

OTHER PUBLICATIONS

"An Electrolytic Tank Investigation into Stepped Thrust-Bearings", Proceedings of the Institute of Mechanical Engineers, 169, 1955, pp. 679–688.

Primary Examiner—Lenard A. Footland
Attorney, Agent, or Firm—Yount & Tarolli

[57] ABSTRACT

The invention provides a radial friction bearing assembly, particularly for rotatably mounting the rolls of a paper or textile material processing machine, which will give a stable rotational movement without any vibrations and ensures that always an uninterrupted lubrication film is available, even at very low rotational speeds. A preferred embodiment of the bearing assembly comprises a stationary shaft member and an annular sleeve member rotatably mounted on the shaft member. The latter one comprises on its outer surface a plurality of equidistantially arranged longitudinal grooves which extend parallelly to the axis of the shaft member. A plurality of trapezoidally shaped recesses or pockets, having a substantially smaller depth than the longitudinal grooves, extend from and communicate with said grooves, the base edge of the trapezoid adjoining the leading edge of the longitudinal grooves. Between two adjacent recesses or pockets, a circumferential annular groove is provided which communicates with all longitudinal grooves. A lubricant, preferably water, is fed to the longitudinal grooves and circulates therein as well as in said circumferential grooves, said recesses and in a gap provided between the stationary shaft member and the rotating sleeve member.

15 Claims, 4 Drawing Figures

RADIAL FRICTION BEARING ASSEMBLY

BACKGROUND OF THE INVENTION

1. Field of the Invention

The present invention relates to a radial friction bearing, particularly for rotating rolls of a paper or textile processing machine, comprising a central shaft member and an annular sleeve member mounted coaxially with reference to the shaft member, whereby a gap is formed between said shaft member and said sleeve member to receive a lubricant, and whereby either said sleeve member is rotatably mounted on the stationary shaft member or said sleeve member is stationary and rotatably receives said shaft member.

The radial friction bearing assembly of the present invention is particularly suitable in connection with the rotatable mounting of essentially cylindrical conveying rolls and processing rolls used in the paper and textile industry. In connection with the support of such rolls two basic problems exist.

Firstly it is of paramount importance that such rolls be in a position to rotate, under certain circumstances during very extended periods, with very low rotational speeds, i.e. with a relative tangential speed between stationary and rotatable part of about 0.5 to 1 meters/sec. Simultaneously it must be warranted that a reliable operation at the normal operating speed, which may be quite high, is possible. In any case it must be ensured that an uninterrupted lubrication film be present, that means, that the stationary and the rotatable parts never come into contact one with the other one. The hydrodynamic forces of the lubricant, therefore, have to develop a sufficient supporting power even at very low speeds to provide under any circumstances an uninterrupted lubrication film between the stationary and the rotating parts of the bearing assembly. The problems occuring at very low rotational speeds could be solved by using a very highly viscous lubrication fluid. However it must be considered that not only the hydrodynamic power increases with increasing rotational speed, but also the energy consumption; the latter one will proportionally increase with reference to the rotational speed, on the one hand, and with reference to the viscosity of the lubricant, on the other hand. If one uses a normal lubrication oil, the situation will occur that the energy consumption of the bearing assembly for e.g. a paper roll rotating with a considerably high speed will be such that an economically tolerable limit is surpassed. Due to these considerations a radial friction bearing assembly should be constructed, as far as its hydrodynamical behaviour is concerned, in a way that enough hydrodynamic power is developed to provide a trouble-free operation, even if a very low viscous lubricant is used and even if the roll is rotated at very low speed. In the case of paper processing rolls, water has prooved to be a very suitable, low viscous lubricant.

Secondly an important problem in supporting such rolls may be seen in the fact that vibrations may occur, even if the rotating parts of the bearing assembly are dynamically balanced. Such vibrations may be caused by an insufficient hydrodynamic system of the bearing assembly, i.e. by a lubrification film which is not in a position to provide a correct distribution of the required hydrodynamic power at all rotational speeds. A roll supported by a hydrodynamic friction bearing assembly is required to operate also at critical speeds without the occurence of undesired vibrations.

2. Prior Art

Radial friction bearing assemblies of a general kind are well known in the prior art in different embodiments. However, depending of the fact whether the load in radial direction is very high, as e.g. in the case of axle bearings of railroad vehicles, or the load is comparatively low. e.g. in the case of rotating conveying rolls, different problems may occur; numerous disclosures refer to a solution of these specific problems.

Axial friction bearing are known, i.e. friction bearing which have to take a load effective in the direction of the axis of the bearing assembly, which comprise pockets adapted to receive a lubricant and being arranged on the flat surface of the stationary member of the bearing assembly (C. F. Kettleborogh, "An Electrolytic Tank Investigation into Stepped Thrust Bearings", Proceedings of the Institution of Mechanical Engineers, 169, (1955), pp. 679–688). However the problems in connection with axial bearing assemblies are quite different from the problems in connection with radial bearing assemblies, and solutions which might be well suited for one kind of bearing assemblies cannot be simply transformed to the other kind of bearing assemblies, or if even possible, only with great difficulties. This is particularly true in the case of prevention from undesired vibration which normally occurs only at radial friction bearing assemblies.

The U.S. Pat. No. 4,120,544 discloses a radial friction bearing comprising a stationary sleeve member, a rotatable shaft member mounted therein and a supply of lubricant to be fed between the stationary and the rotating part of the bearing. The bearing surface of the rotating shaft member is provided with grooves and is further subdivided in the circumferential direction into several partial surfaces, each of which has a flute or groove running in axial direction and other pumping grooves which build up pressure and which are on both sides of this flute opposite to one another and inclined at an angle to the circumferential direction. The individual partial surfaces are separated from each other by choke surfaces which limit flow of the lubricant.

It seems to be an object of the invention of the U.S. Pat. No. 4,120,544 to provide, with reference to known bearing assemblies of this kind, an improved load receiving capacity in both directions of rotation, simultaneously keeping in mind to ensure an economical manufacturing of such a bearing assembly. According to this Patent these objects should be met by the provision of a bearing assembly in which the shaft member comprises, on its outer surface, a plurality of groups of grooves and being divided, in circumferential direction, into several partial surfaces, and further by the fact that each partial surface comprises an axially extending groove fed with a lubricant and including a plurality of self-pressurizing grooves on both sides of this central axial groove, said self-pressurizing grooves extending from said central groove in an inclined, circumferential direction.

However it is believed that such an axial friction bearing assembly is not suitable at all for an application where a rotatable bearing member moves but with a very low speed with reference to a stationary bearing member, since no higly loadable lubrification film may be built up between the rotatable and the stationary part at low speed, because the overall cross section of the lubrication grooves is too high. Furthermore no measures can be seen in the disclosure of the above mentioned Patent to avoid the above cited higly undesirable vibrations.

OBJECTS OF THE INVENTION

It is therefore a primary object of the invention to provide a radial friction bearing assembly which avoids the disadvantages mentioned above and which presents a solution to all these problems. Particularly it is an object of the invention to provide a radial friction bearing assembly which allows the use of a lubricant having a low viscosity, e.g. water. A further object of the invention is to provide a radial friction bearing assembly which always disposes of an uninterrupted lubrication film between its stationary and its rotating part, at low as well as at high revolution speeds, even if a lubricant having an extremly low viscosity is used. Still a further object of the invention is to provide a radial friction bearing assembly with a hydrodynamic system which reliably prevents the bearing and, consequently, the supported machine element, e.g. a paper processing roll, from any undesired vibration, independently from the rotational speed.

SUMMARY OF THE INVENTION

In order to meet the aforementioned objects of the invention, there is a number of different embodiments, which nevertheless base on the same inventive idea.

A first possibility provides a radial friction bearing assembly comprising a stationary, essentially cylindrical shaft member and an essentially annular sleeve member rotatably mounted on said shaft member, whereby a gap is provided between the outer surface of said shaft member and the inner surface of said sleeve member; this gap is adapted to receive a lubricant. The shaft member is provided, on its outer surface, with a plurality of longitudinal grooves extending parallelly to the axis of the shaft member; the grooves are equidistantially arranged around said outer surface, and one end of said grooves is connected to a lubricant supply means to feed a lubricant into said gap between said shaft member and said sleeve member. The outer surface of the shaft member is provided with a plurality of essentially trapezoidal recesses extending substantially in circumferential direction of said shaft member, the base edge of the trapezoid of said recesses adjoining the longitudinal groove and communicating therewith in order to enable the lubricant circulating in said longitudinal groove to enter the space between the trapezoidal recess and the inner surface of the sleeve member rotating on the shaft member.

A second possibility provides a radial friction bearing assembly comprising a stationary, essentially cylindrical shaft member and an essentially annular sleeve member rotatably mounted on the shaft member, a gap being provided between the outer surface of the shaft member and the inner surface of the sleeve member, adapted to receive a lubricant. The sleeve member is provided, on its inner surface, with a plurality of longitudinal grooves extending parallelly to the axis of the sleeve member and being equidistantially arranged around the inner surface. One end of these longitudinal grooves is connected to a lubricant supply means to feed a lubricant into the gap between the shaft member and the sleeve member. The inner surface of the sleeve member is provided with a plurality of essentially trapezoidal recesses extending substantially in circumferential direction of the sleeve member. The base edge of the trapezoid of the recesses adjoins the longitudinal groove and communicates therewith in order to enable the lubricant circulating in the longitudinal groove to enter the space between the trapezoidal recess and the outer surface of the shaft member.

A third possibility provides a radial friction bearing assembly comprising a stationary, essentially annular sleeve member and an essentially cylindrical shaft member rotatably mounted in the sleeve member. A gap is provided between the outer surface of the shaft member and the inner surface of the sleeve member, adapted to receive a lubricant. The shaft member is provided, on its outer surface, with a plurality of longitudinal grooves extending parallelly to the axis of the shaft member and being equidistantially arranged around the outer surface. One end of the longtitudinal grooves is connected to a lubricant supply means to feed a lubricant into the gap between the shaft member and the sleeve member. The outer surface of the shaft member further is provided with a plurality of essentially trapezoidal recesses extending substantially in circumferential direction of the shaft member, the base edge of the trapezoid of said recesses adjoining the longitudinal groove and communicating therewith in order to enable the lubricant circulating in the longitudinal groove to enter the space between the trapezoidal recess and the inner surface of the sleeve member rotating on the shaft member.

A fourth possibility provides a radial friction bearing assembly comprising a stationary, essentially annular sleeve member and an essentially cylindrical shaft member rotatably mounted in the sleeve member, a gap being provided between the outer surface of said shaft member and the inner surface of said sleeve member adapted to receive a lubricant. The sleeve member is provided, on its inner surface, with a plurality of longitudinal grooves extending parallelly to the axis of the sleeve member and being equidistantially arranged around the inner surface. One end of the longitudinal grooves is connected to a lubricant supply means to feed a lubricant into the gap between the shaft member and the sleeve member. The inner surface of the sleeve member further is provided with a plurality of essentially trapezoidal recesses extending substantially in circumferential direction of the sleeve member. The base edge of the trapezoid of said recesses adjoins said longitudinal groove and communicates therewith in order to enable the lubricant circulating in the longitudinal groove to enter the space between the trapezoidal recess and the outer surface of the shaft member.

In any of the aforementioned embodiments, an annular groove may be provided between two adjacent trapezoidal recesses. Such grooves are situated either on the outer surface of the shaft member or on the inner surface of the sleeve member, but communicate in any case with said plurality of longitudinal grooves extending parallelly to the axis of the shaft member and the sleeve member, respectively.

A particularly advantageous embodiment provides a radial friction bearing assembly comprising a stationary, essentially cylindrical shaft member, an essentially annular sleeve member rotatably mounted on said shaft member, a gap being provided between the outer surface of said shaft member and the inner surface of said sleeve member adapted to receive a lubricant. The shaft member is provided, on its outer surface, with a plurality of longitudinal grooves extending parallelly to the axis of the shaft member and being equidistantially arranged around the outer surface, one end of the grooves being connected to a lubricant supply means to feed a lubricant into the gap between the shaft member and the sleeve member. The sleeve member is provided, on its inner surface, with a plurality of essentially trapezoidal recesses extending substantially in circumferential direction of the sleeve member, the base edge of the trapezoid of these recesses being the leading edge with reference to the relative rotational sense of the sleeve member and the shaft member.

Advantageously, the depth of the longitudinal grooves and the depth of the annular grooves is substantially larger than the depth of the trapezoidal recesses. Furthermore, the cross section of the longitudinal grooves may be greater than the cross section of the annular grooves.

In a preferred embodiment, the depth of the trapezoidal recesses is between 15 to 75 micrometers, preferably about 35 micrometers, and the relation of the height (L) to the base edge (b) of each trapezoidal recess equals to about 0.8 to 1.2. The relation of the base edge (b) to the top edge ($b_1$) of each trapezoidal recess may advantageously equal to about 2.3 to 2.6.

BRIEF DESCRIPTION OF THE DRAWINGS

In the following, a preferred embodiment of the radial friction bearing assembly will be described, with reference to the accompanying drawings. It is understood that further embodiments, which are not expressively shown and described, but which are within the scope of the present invention, are also possible. In the drawings.

DETAILED DESCRIPTION OF A PREFERRED EMBODIMENT

Figure 1:
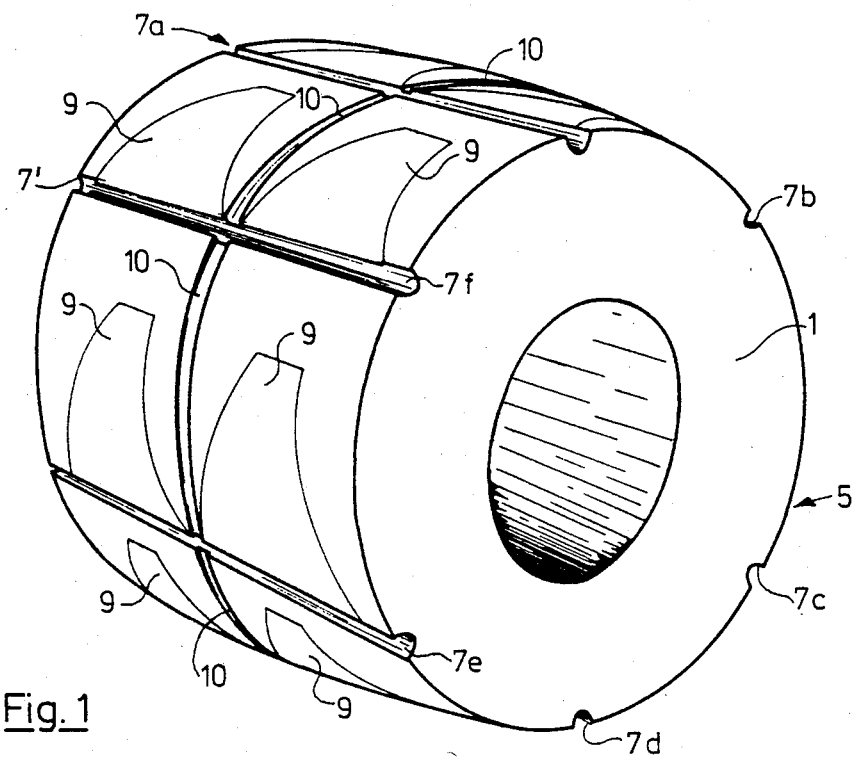
FIG. 1 shows a perspective view of a shaft member, which is, in the present embodiment, stationary, of a radial friction bearing assembly.
Figure 2:
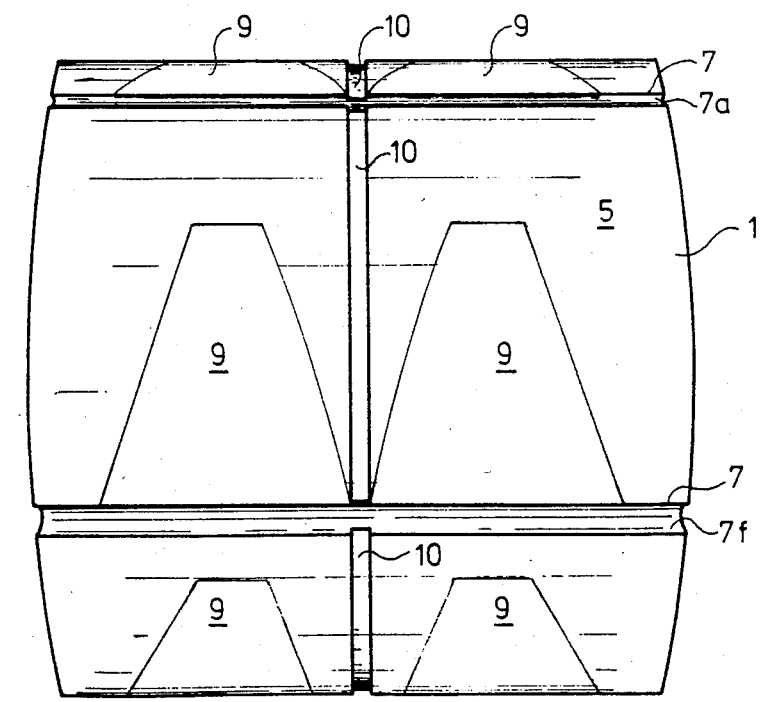
FIG. 2 shows a side view of the shaft member of FIG. 1.
Figure 3:
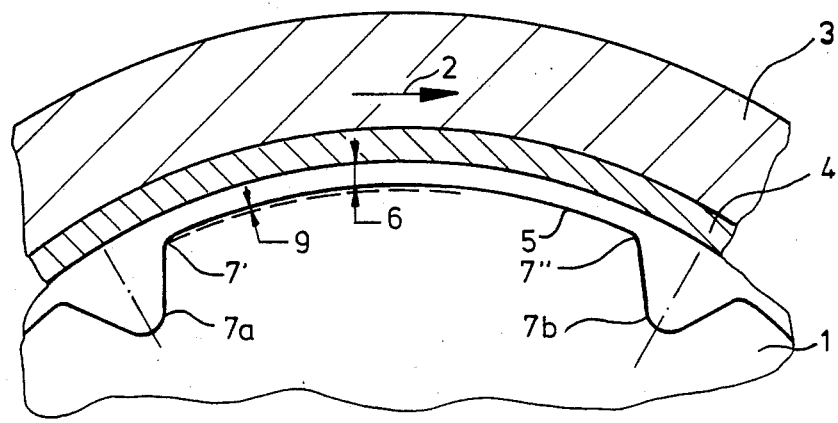
FIG. 3 shows a partial, sectional view of an embodiment of the bearing assembly according to the invention.

The bearing assembly shown in FIGS. 1 to 3 comprises a stationary shaft member 1 of essentially cylindrical configuration and an essentially annular sleeve member 3, coaxially mounted with reference to the shaft member 1 and rotating thereabout in the direction of arrow 2. The inner surface of the sleeve member 3 is provided with a suitable surface coating 4, e.g. a bearing material. A gap 6 is arranged between the inner surface of the surface coating 4 and the outer surface 5 of the shaft member 1; this gap 6 is adapted to receive a lubricant. Depending of the diameter of the shaft member 1 and the sleeve member 3, the gap may have a width of approximately 0.1 to 0.4 mm.

It may be clearly seen in FIG. 1 that the outer surface 5 of the shaft member 1 comprises a plurality of longitudinal grooves $7a$ ... $7f$ which extend parallely to the axis of the cylindrical shaft member 1. In the present example as shown in the drawings, there are provided six longitudinal grooves $7a$ ... $7f$ which are evenly and symmetrically arranged around the circumference of the outer surface 5 of the shaft member 1. In FIG. 3, a partial cross section of the sleeve member 3 and the shaft member 1 can be seen, the latter one having the longitudinal grooves $7a$ and $7b$. The depth and the cross section, respectively, of the longitudinal grooves $7a$ ... $7f$ depends of the required amount of supply of the lubricant.

Figure 4:
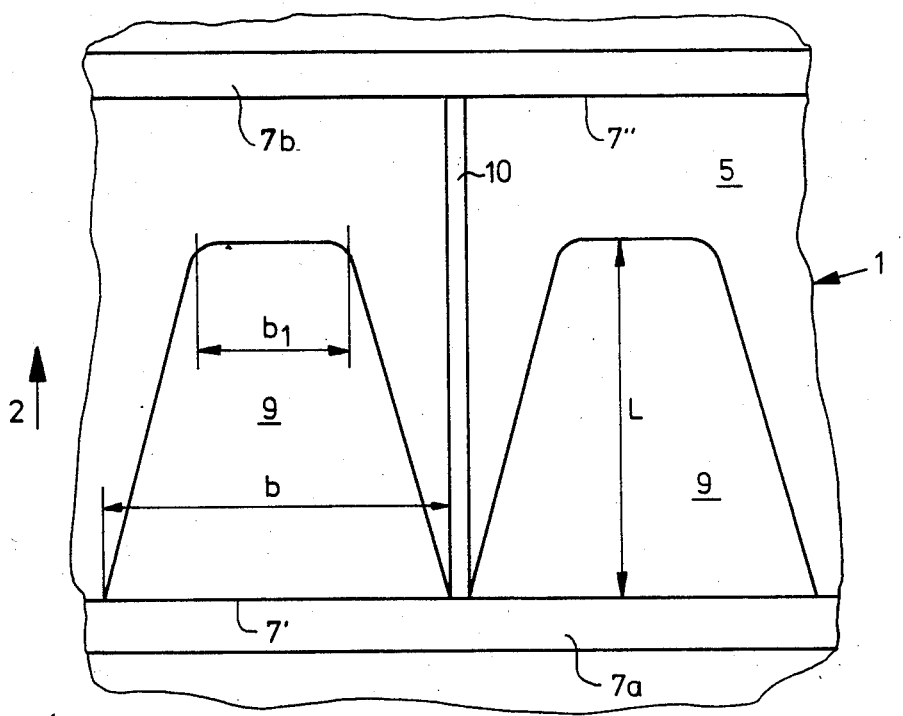
FIG. 4 shows a partial plain view of the outer surface of the stationary shaft member.

The outer surface 5 of the shaft member 1 is further provided with a plurality of recesses or pockets 9 which have essentially trapezoidal shape and which extend from the edge 7' of the longitudinal grooves $7a$ ... $7f$. In FIGS. 1, 2 and 4, two full pockets 9 are shown, while it is understood that in the present example a total of twelve pockets 9 is provided on the outer surface 5 of the shaft member 9. The recesses or pockets 9 communicate along their base edge b (FIG. 4) with the adjacent longitudinal groove $7a$ ... $7f$ and extend, in the direction of the arrow 2 in FIG. 3, towards the edge 7" of the next longitudinal groove 7, but not up to it. Furthermore, it can be seen particularly in FIGS. 2 and 4, that a circumferential groove 10 is provided in the outer surface 5 of the shaft member 1. This groove 10 is located between two adjacent recesses or pockets 9 and extends all around the surface 5 of the shaft member 1, thereby communicating with each longitudinal groove $7a$ ... $7f$ at each point of intersection.

The depth of the recesses or pockets 9, which are exaggeratedly shown in FIGS. 1, 2 and 3, is preferably about between 15 to 75 microns, more preferably about 35 microns. Anyhow the depth thereof is much smaller than the depth not only of the circumferential grooves 10 but also of the longitudinal grooves $7a$ ... $7f$. Preferably the depth of the longitudinal grooves $7a$ ... $7f$ and thereby their cross section is considerably more than the depth and the cross section, respectively, of the circumferential grooves 10. In the present example as shown in the drawings, the overall diameter of the shaft member 1 amounts to about 15 to 25 cm. In this case the depth of the circumferential grooves 10 will be about 1 to 2 mm and the depth of the longitudinal grooves $7a$ ... $7f$ a multiple thereof, let's say 5 to 10 mm.

The height L of the trapezoidally shaped recesses or pockets 9 (see FIG. 4) usually will be about the same as the width b of the trapezoid. A range of the relation L:b of about 0.8 to 1.2 has prooven to be advantageous. The relation of the length of the base edge b, adjoining the longitudinal grooves $7a$ ... $7f$, to the length of the top edge $b_1$ of the trapezoidal recesses or pockets amounts to about 2.3 to 2.6.

As a lubricant and simultaneously as a cooling agent, water is well suitable for the application in the radial friction bearing assembly of the invention. In the embodiment shown in the drawings and hereinbefore explained, having a stationary shaft member 1 and a rotatably mounted sleeve member 3, the lubricant may easily be fed to the longitudinal grooves $7a$ ... $7f$ at one end thereof and removed from the grooves at their opposite end.

A roll, e.g. a paper or textile material processing roll, for which the radial friction bearing assembly is particularly suitable, may reach tangential speeds of up to 40 m/sec. The bearing assembly of the present invention ensures, on the one hand, that always an uninterrupted, highly loadable lubrication film is present, not only during normal operation speed, but also during start-up and idling conditions, and, on the other hand, that no undesired vibrations may occur during all these operational conditions.

It is understood that the embodiment hereinbefore described is only one possibility of realization of the bearing assembly of the invention. Other embodiments are defined in the appended claims. For example, the shaft member may be rotatably mounted in a stationary sleeve, or the longitudinal grooves may be provided in the stationary shaft member, while the circumferential grooves as well as the recesses or pockets may be provided in the rotating sleeve member, or the longitudinal grooves may be provided in the stationary sleeve member, while the circumferential grooves as well as the recesses or pockets might be provided in the rotating shaft member, etc.

The radial friction bearing assembly of the present invention, in any embodiment, but particularly in the embodiment as shown in the accompanying drawings, has a load carrying capacity which is much higher than the one of radial bearing assemblies of the same or similar kind known in the prior art. Particularly to be emphazised is the fact that the bearing assembly of the present invention is in a position to develop very high hydrodynamic power at comperatively low revolution speeds.

What we claim is:

1. A radial friction bearing assembly comprising
   a stationary, essentially cylindrical shaft member, an essentially annular sleeve member rotatably mounted on said shaft member, a gap being provided between the outer surface of said shaft member and the inner surface of said sleeve member, adapted to receive a lubricant;
   said shaft member being provided, on its outer surface, with a plurality of longitudinal grooves extending parallelly to the axis of said shaft member and being equidistantially arranged around said outer surface, one end of said grooves being connected to a lubricant supply means to feed a lubricant into said gap between said shaft member and said sleeve member;
   said outer surface of said shaft member further being provided with a plurality of essentially trapezoidal recesses extending substantially in circumferential direction of said shaft member, the base edge of the trapezoid of said recesses adjoining said longitudinal groove and communicating therewith in order to enable the lubricant circulating in said longitudinal groove to enter the space between said trapezoidal recess and the inner surface of said sleeve member rotating on said shaft member.

2. A radial friction bearing assembly according to claim 1, said shaft member further comprising annular grooves arranged between two adjacent pairs of said trapezoidal recesses, said annular grooves extending around the circumference of said shaft member and communicating with said plurality of said longitudinal grooves.

3. A radial friction bearing assembly comprising
   a stationary, essentially cylindrical shaft member, an essentially annular sleeve member rotatably mounted on said shaft member, a gap being provided between the outer surface of said shaft member and the inner surface of said sleeve member, adapted to receive a lubricant;
   said sleeve member being provided, on its inner surface, with a plurality of longitudinal grooves extending parallelly to the axis of said sleeve member and being equidistantially arranged around said inner surface, one end of said grooves being connected to a lubricant supply means to feed a lubricant into said gap between said shaft member and said sleeve member;
   said inner surface of said sleeve member further being provided with a plurality of essentially trapezoidal recesses extending substantially in circumferential direction of said sleeve member, the base edge of the trapezoid of said recesses adjoining said longitudinal groove and communicating therewith in order to enable the lubricant circulating in said longitudinal groove to enter the space between said trapezoidal recess and the outer surface of said shaft member.

4. A radial friction bearing assembly according to claim 3, said sleeve member further comprising annular grooves arranged between two adjacent pairs of said trapezoidal recesses, said annular grooves extending around the circumference of the inner surface of said sleeve member and communicating with said plurality of said longitudinal grooves.

5. A radial friction bearing assembly comprising
   a stationary, essentially annular sleeve member, an essentially cylindrical shaft member rotatably mounted in said sleeve member, a gap being provided between the outer surface of said shaft member and the inner surface of said sleeve member, adapted to receive a lubricant;
   said shaft member being provided, on its outer surface, with a plurality of longitudinal grooves extending parallelly to the axis of said shaft member and being equidistantially arranged around said outer surface, one end of said grooves being connected to a lubricant supply means to feed a lubricant into said gap between said shaft member and said sleeve member;
   said outer surface of said shaft member further being provided with a plurality of essentially trapezoidal recesses extending substantially in circumferential direction of said shaft member, the base edge of the trapezoid of said recesses adjoining said longitudinal groove and communicating therewith in order to enable the lubricant circulating in said longitudinal groove to enter the space between said trapezoidal recess and the inner surface of said sleeve member rotating on said shaft member.

6. A radial friction bearing assembly according to claim 5, said shaft member further comprising annular grooves arranged between two adjacent pairs of said trapezoidal recesses, said annular grooves extending around the circumference of said shaft member and communicating with said plurality of said longitudinal grooves.

7. A radial friction bearing assembly comprising
   a stationary, essentially annular sleeve member, an essentially cylindrical shaft member rotatably mounted in said sleeve member, a gap being provided between the outer surface of said shaft member and the inner surface of said sleeve member adapted to receive a lubricant;
   said sleeve member being provided, on its inner surface, with a plurality of longitudinal grooves extending parallelly to the axis of said sleeve member and being equidistantially arranged around said inner surface, one end of said grooves being connected to a lubricant supply means to feed a lubricant into said gap between said shaft member and said sleeve member;
   said inner surface of said sleeve member further being provided with a plurality of essentially trapezoidal recesses extending substantially in circumferential direction of said sleeve member, the base edge of the trapezoid of said recesses adjoining said longitudinal groove and communicating therewith in order to enable the lubricant circulating in said longitudinal groove to enter the space between said trapezoidal recess and the outer surface of said shaft member.

8. A radial friction bearing assembly according to claim 7, said sleeve member further comprising annular grooves arranged between two adjacent pairs of said trapezoidal recesses, said annular grooves extending around the circumference of the inner surface of said sleeve member and communicating with said plurality of said longitudinal grooves.

9. A radial friction bearing assembly comprising
a stationary, essentially cylindrical shaft member, an essentially annular sleeve member rotatably mounted on said shaft member, a gap being provided between the outer surface of said shaft member and the inner surface of said sleeve member adapted to receive a lubricant;
said shaft member being provided, on its outer surface, with a plurality of longitudinal grooves extending parallelly to the axis of said shaft member and being equidistantially arranged around said outer surface, one end of said grooves being connected to a lubricant supply means to feed a lubricant into said gap between said shaft member and said sleeve member;
said sleeve member being provided, on its inner surface, with a plurality of essentially trapezoidal recesses extending substantially in circumferential direction of said sleeve member, the base edge of the trapezoid of said recesses being the leading edge with reference to the relative rotational sense of said sleeve member and said shaft member.

10. The bearing assembly of anyone of the claims 1 to 8, in which said trapezoidal recesses extend in the direction of rotation of the sleeve member and the shaft member, respectively, along a part of the surface thereof, beginning at one of said longitudinal grooves and extending towards, but not up to the adjoining longitudinal groove.

11. The bearing assembly of anyone of the claims 1 to 9, in which the depth of the longitudinal grooves and the depth of the annular grooves is subtantially larger than the depth of the trapezoidal recesses.

12. The bearing assembly of anyone of the claims 1 to 9, in which the cross section of the longitudinal grooves is greater than the cross section of the annular grooves.

13. The bearing assembly of anyone of the claims 1 to 9, in which the depth of the trapezoidal recesses is between 15 to 75 micrometers, preferably about 35 micrometers.

14. The bearing assembly of anyone of the claims 1 to 9, in which the relation of the height (L) to the base edge (b) of each trapezoidal recess equals to about 0.8 to 1.2.

15. The bearing assembly of anyone of the claims 1 to 9, in which the relation of the base edge (b) to the top edge ($b_1$) of each trapezoidal recess equals to about 2.3 to 2.6.

* * * * *